United States Patent
Leise et al.

(10) Patent No.: US 10,387,963 B1
(45) Date of Patent: Aug. 20, 2019

(54) METHOD AND SYSTEM OF GENERATING A CALL AGENT AVATAR USING ARTIFICIAL INTELLIGENCE

(71) Applicant: STATE FARM MUTUAL AUTOMOBILE INSURANCE COMPANY, Bloomington, IL (US)

(72) Inventors: William J. Leise, Normal, IL (US); Douglas Albert Graff, Mountain View, MO (US); Christina P. Mullen, Waterford, VA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 88 days.

(21) Appl. No.: 14/864,645

(22) Filed: Sep. 24, 2015

(51) Int. Cl.
    *H04M 3/42* (2006.01)
    *G06Q 40/08* (2012.01)

(52) U.S. Cl.
    CPC .............. *G06Q 40/08* (2013.01); *H04M 3/42* (2013.01)

(58) Field of Classification Search
    CPC ................................ G06Q 40/08; H04M 3/42
    USPC ............................................................ 705/4
    See application file for complete search history.

(56) References Cited

U.S. PATENT DOCUMENTS

| | | | |
|---|---|---|---|
| 8,972,100 B2 | 3/2015 | Mullen et al. | |
| 8,977,425 B1 | 3/2015 | Mullen et al. | |
| 2009/0044112 A1* | 2/2009 | Basso | G06T 13/205 715/706 |
| 2014/0250195 A1* | 9/2014 | Capper | G06N 3/004 709/206 |
| 2014/0278572 A1* | 9/2014 | Mullen | G06Q 40/08 705/4 |
| 2015/0039522 A1 | 2/2015 | Dillard et al. | |
| 2015/0178852 A1 | 6/2015 | Mullen et al. | |
| 2015/0199764 A1* | 7/2015 | Widener | G06Q 40/08 705/4 |

OTHER PUBLICATIONS

U.S. Appl. No. 14/085,497, filed Nov. 20, 2013.
U.S. Appl. No. 14/627,145, filed Feb. 20, 2015.
U.S. Appl. No. 14/627,170, filed Feb. 20, 2015.

* cited by examiner

*Primary Examiner* — Jason Borlinghaus
*Assistant Examiner* — Ambreen A. Alladin
(74) *Attorney, Agent, or Firm* — Marshall, Gerstein & Borun LLP; Randall G. Rueth

(57) ABSTRACT

A method and system may generate a call agent avatar for responding to insurance-related inquiries. A user's client device such as a smart-phone, smart watch, or tablet computer, may receive an insurance-related inquiry or banking-related inquiry from the user. Several data sources may be utilized to automatically determine a response to the insurance-related inquiry or banking-related inquiry, and a call agent avatar may be displayed on the user's client device while the response is displayed/played by the client device. The call agent avatar may be animated to move in synchronization with the response so that it appears the call agent avatar is providing the response to the user.

18 Claims, 8 Drawing Sheets

INSURANCE POLICY DATA

| | Customer Name | Customer ID | Policy Type | Deductible | Coverage Limits | Premium |
|---|---|---|---|---|---|---|
| 402 | John Doe | 100 | Vehicle Insurance | $300 | Lesser of $30,000 or vehicle value | $50/ month |
| 404 | John Doe | 100 | Life Insurance | None | $100,000 | $500/ year |
| 406 | Jane Smith | 120 | Homeowners Insurance | 15% | $500,000 | $400/ month |
| 408 | Bob Cobb | 130 | Renters Insurance | $100 | $5,000 | $100/year |
| 410 | Jack Lang | 140 | Vehicle Insurance | 10% | Lesser of $50,000 or vehicle value | $80/ month |
| 412 | David Thomas | 150 | Health Insurance | $50 | $10,000 | $100/ month |

FIG. 4

METHOD AND SYSTEM OF GENERATING A CALL AGENT AVATAR USING ARTIFICIAL INTELLIGENCE

TECHNICAL FIELD

The present disclosure generally relates to systems and methods for providing a call agent avatar to answer insurance-related inquiries and, more particularly to automatically providing a visual and audio response to a user via the user's client device.

BACKGROUND

Today, in a competitive sales market, including insurance sales, organizations often field or service customer calls via a contact center. The contact center may be a unit within the organization or a separate business that the independent organization contracts with to receive customer calls, for example. In any case, the calls to the contact center are typically handled by providing contact information, such as an 800 number for a customer to call. When the customer calls the 800 number, a call agent answers the phone, manually confirms the customer's identity, identifies the purpose of the call, helps the customer, as needed, and ends the call. Organizations may need to employ hundreds or thousands of call agents to field customer calls.

SUMMARY

To automatically answer an insurance-related inquiry or banking-related inquiry by a user, an avatar generation system may receive a voice input from a user, such as "How much is my premium on my car insurance?" Based on the voice input, the avatar generation system may for example, using natural language processing, identify a course of action to take (also referred to herein as a "requested action"), such as to retrieve the user's monthly car insurance premium amount. For each course of action, the avatar generation system may store a set of rules for performing the course of action. In other embodiments, the set of rules may be learned. The avatar generation system may follow the set of rules to retrieve the requested insurance-related information, such as the user's monthly car insurance premium amount using a combination of one or several databases and/or external data sources. Once the requested insurance-related information is retrieved, the insurance-related information may be combined with a pre-stored response which may result in, "Good morning John. Your premium this month is $215."

Additionally, a graphical representation of a customer service representative or call agent (a "call agent avatar") may be generated and displayed on the user's client device such that it appears the call agent avatar is communicating the response to the user. For example, the response may be an audio response. The call agent avatar may be animated to move in synchronization with the audio response such that the call agent avatar's mouth appears to move in accordance with the words provided by the audio response.

In this manner, users may receive immediate answers to their insurance-related questions. Moreover, the answers may be presented in a user-friendly and customer service oriented approach so that users do not feel like they are communicating with an automated system. The present embodiments advantageously allow users to efficiently and accurately receive answers to their insurance-related questions without the disadvantages of communicating with a person (e.g., having to wait on hold, limited hours in which the contact center is open, uninterested or unreliable call agents, idle conversation, etc.). Moreover, by performing natural language processing and displaying a call agent avatar for responding to user input, the present embodiments advantageously allow users to feel as if they are communicating with a human rather than a machine. Further, by learning the set of rules for performing a requested action, the present embodiments advantageously improve upon automated answering systems, allowing for a wider range of inquiries which may be answered without having to preprogram the responses.

In an embodiment, a computer-implemented method for generating a call agent avatar is provided. The method includes receiving input from a user including an insurance-related inquiry, determining a requested action to perform based on the user input, and analyzing, via a set of rules that correspond to the requested action, customer data and insurance data corresponding to the user to identify insurance-related information in response to the requested action. The method further includes causing a client device of the user to display a graphical representation of a customer service representative and causing the client device of the user to provide a response to the insurance-related inquiry including the insurance-related information, where the response is provided while the graphical representation of the customer service representative is displayed so that the customer service representative appears to provide the response.

In another embodiment, a system for generating a call agent avatar is provided. The system includes one or more processors, a communication network and a non-transitory computer-readable memory coupled to the one or more processors, and the communication network and storing instructions thereon. When executed by the one or more processors, the instructions cause the system to receive, via the communication network, input from a user including an insurance-related inquiry, determine a requested action to perform based on the user input, and analyze, via a set of rules that correspond to the requested action, customer data and insurance data corresponding to the user to identify insurance-related information in response to the requested action. The instructions further cause the system to cause, via the communication network, a client device of the user to display a graphical representation of a customer service representative, and cause, via the communication network, the client device of the user to provide a response to the insurance-related inquiry including the insurance-related information, where the response is provided while the graphical representation of the customer service representative is displayed so that the customer service representative appears to provide the response.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4 illustrates exemplary insurance policy data stored in the insurance policy database in accordance with the presently described embodiments.

DETAILED DESCRIPTION

Figure 1:
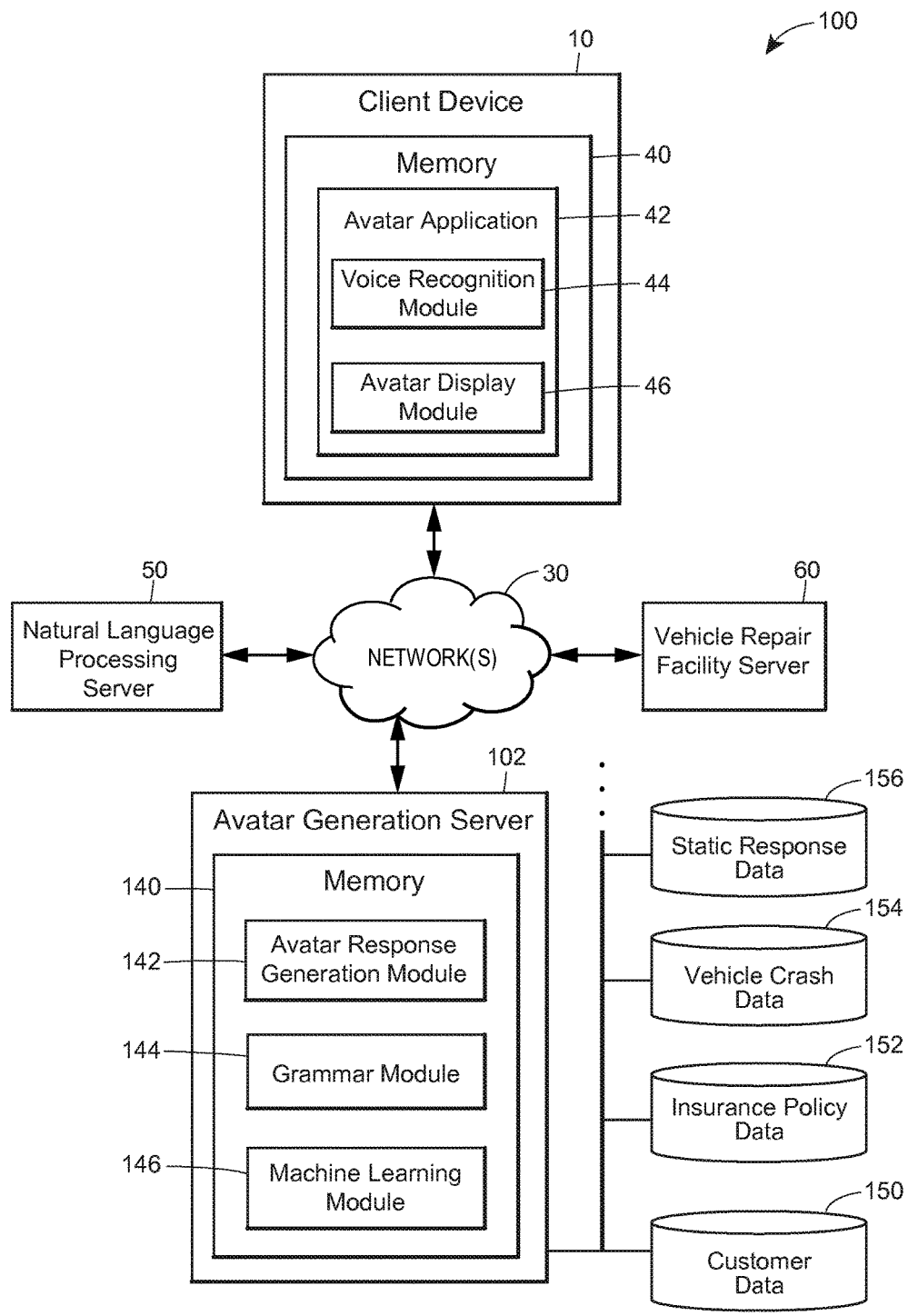
FIG. 1 illustrates a block diagram of a computer network and system on which an exemplary avatar generation system may operate in accordance with the presently described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, as used herein, the term "avatar" may refer to a graphical representation of a person in two-dimensional or three-dimensional form. The graphical representation may be animated such that it appears the person is moving across a computer screen. For example, an avatar may be a graphical representation of a call agent to interact with users of an organization's services.

As used herein, the terms "customer service representative" or "call agent," may refer to a person who handles incoming or outgoing customer calls for an organization. The call agent may handle account inquiries, customer complaints, support issues, etc. For example, if the organization is an insurance provider, the call agent may handle insurance-related inquiries from customers.

Additionally, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein mainly focus on vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," and "customer," are used interchangeably herein to refer to a person, party, or entity (e.g., a business or other organizational entity) that is covered by the insurance policy, e.g., whose insured article or entity (e.g., property, life, health, auto, home, business) is covered by the policy. Generally, the term "user" is used when referring to a person who is operating a client device and is not exclusive of the terms "customer," "passenger," "insured," "insured party," and "policy holder."

The term "insurance-related inquiry" as used herein, generally refers to any question or request which an insurance agent or representative would typically answer. For example, insurance-related inquiries for vehicle insurance may be regarding the customer's deductible on an insurance claim, the customer's insurance premiums, when the customer's vehicle will be ready from a vehicle repair facility, the amount the customer will collect from a vehicle insurance claim, steps to take after a vehicle crash, recommended repair centers for repairing the customer's vehicle after a crash, etc. Insurance-related inquiries for homeowners insurance may be regarding underwriting for determining the customer's insurance premiums, the amount the customer will collect from a homeowners insurance claim, adjustments to the customer's homeowners insurance, for example, when the customer remodels her home, etc. Moreover, insurance-related inquiries may also include any other inquiries related to claims processing, vehicle or home repairs, rental reservations, etc. These are merely a few examples of insurance-related inquiries and are not meant to be limiting. Insurance-related inquiries may include any inquiry related to insurance.

The term "banking-related inquiry" as used herein, generally refers to any question or request which an agent or employee of a bank or a bank representative would typically answer, such as questions regarding bank products and services. For example, banking-related inquiries may be regarding the customer's account balance, an amount of interest the customer earned on the account, deposits and withdrawals, past and current statements, inquiries on how to transfer accounts or assets within the account, inquiries on setting up automatic bill payments using the account, investment inquiries, inquiries regarding loans, etc. However, these are merely a few examples of banking-related inquiries and are not meant to be limiting.

Generally speaking, techniques for generating a call agent avatar may be implemented in a client device, one or several network servers or a system that includes a combination of these devices. However, for clarity, the examples below focus primarily on an embodiment in which an avatar generation server receives voice or text input corresponding to an insurance-related inquiry or a banking-related inquiry from a user's client device. In some embodiments, the user's client device may transcribe the voice input to text and transmit the text input to the avatar generation server. In other embodiments, the avatar generation server may transcribe the voice input to text. The avatar generation server may then generate a response to the voice or text input by retrieving data from one or several databases and/or communicating with one or several additional network servers, such as a vehicle repair facility server.

Additionally, the avatar generation server may generate a call agent avatar and in some embodiments, may animate the call agent avatar to move in synchronization with the response. The avatar generation server may then transmit the call agent avatar and the response to be displayed on the user's client device, where the response may be a voice response, a text response and/or a combination of voice and text. For ease of illustration only, the examples herein are generally directed to insurance-related inquiries for vehicle or automobile insurance. However, it should be appreciated that the avatar generation system may receive and answer insurance-related questions for all types of insurance including each of type of insurance mentioned above. The concepts described herein may be applied to any type of insurance.

Furthermore, for ease of illustration only, the examples herein are generally directed to insurance-related inquiries. However, it should be appreciated that the avatar generation system may also receive and answer banking-related inquiries for all types of bank products and services using the techniques described herein. For example, the avatar generation system may respond to an inquiry regarding the customer's account balance with, "Your current balance is $4,598.00."

Referring to FIG. 1, an example avatar generation system 100 in which the techniques outlined above can be implemented includes a client device 10 which may be communicatively connected to one or several network servers through a digital network 30, as described below. The client device 10 may include, by way of example, various types of "mobile devices," such as a tablet computer, a cell phone, a personal digital assistant (PDA), a smart-phone, a laptop computer, a desktop computer, a portable media player, a home phone, a pager, a wearable computing device, smart glasses, smart watches or bracelets, phablets, other smart devices, devices configured for wired or wireless RF (Radio Frequency) communication, etc.

Figure 2A:
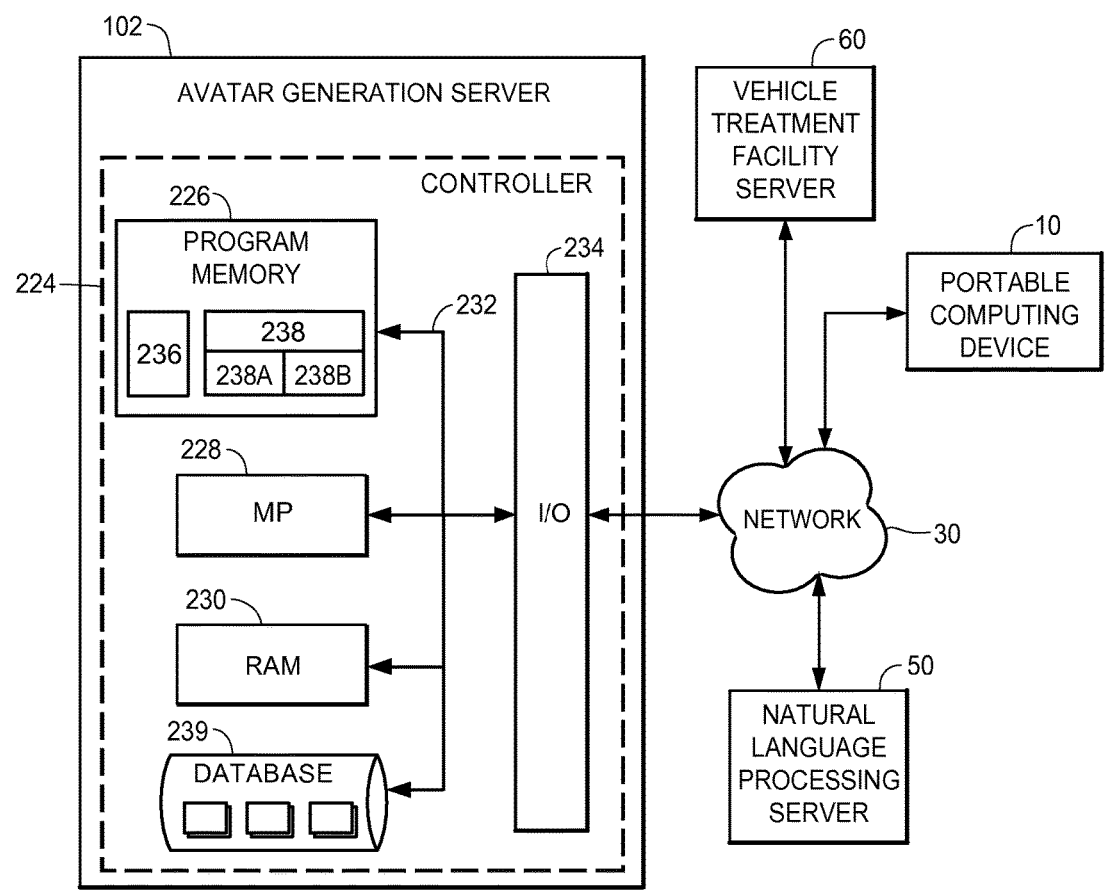
FIG. 2A illustrates a block diagram of an exemplary server device that can operate in the system of FIG. 1 in accordance with the presently described embodiments.
Figure 2B:
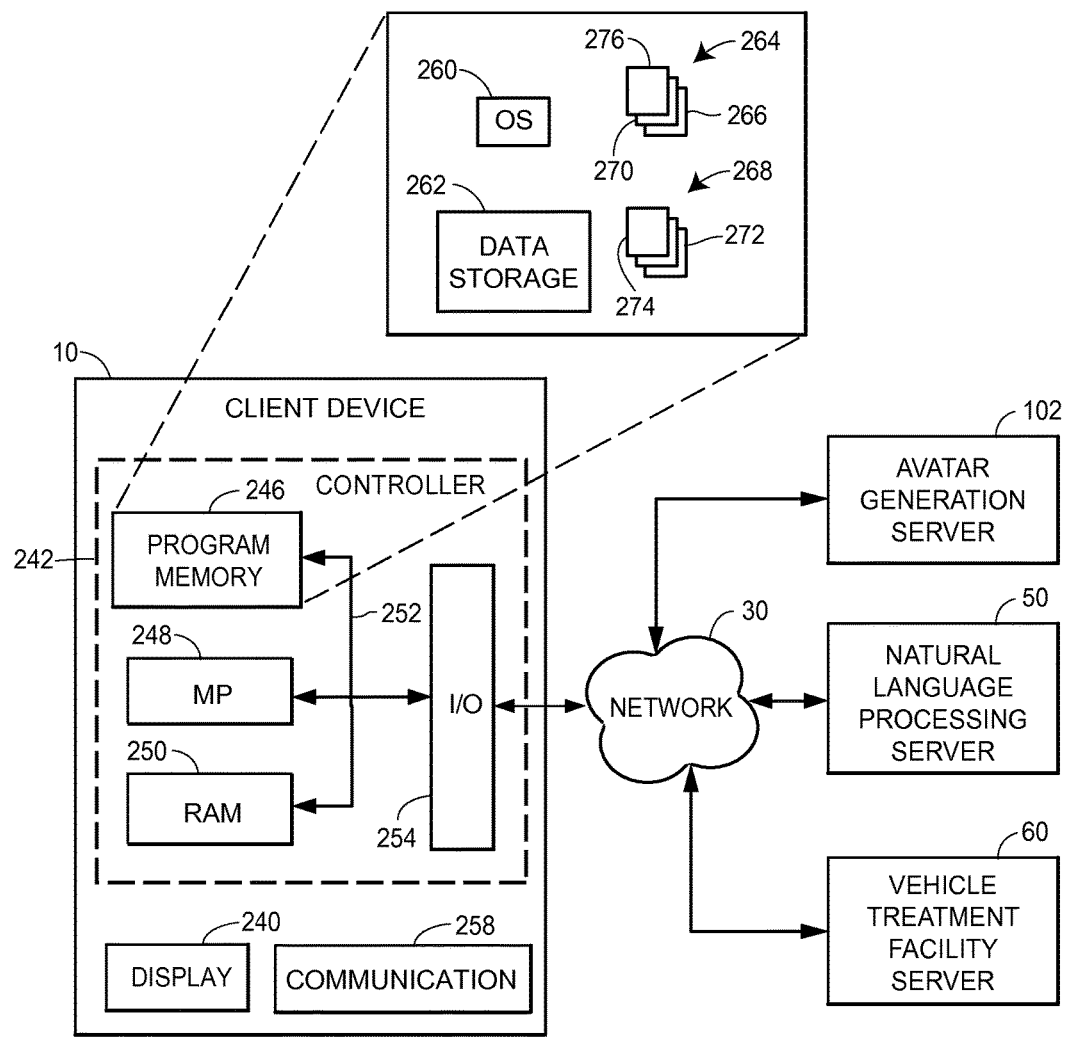
FIG. 2B illustrates a block diagram of an exemplary client device that can operate in the system of FIG. 1 in accordance with the presently described embodiments.

The client device 10 may display a call agent avatar who provides answers to insurance-related inquiries in an avatar application 42, which is stored in the memory 40 as a set of instructions and executes on one or more processors as described in more detail in FIG. 2B. The avatar application 42 may display the call agent avatar supplied by an avatar generation server 102.

In some embodiments, the avatar application 42 may include a voice recognition module 44 which may receive voice input from the user based on her language of choice and transcribe the voice input into text which also may be in her language of choice. The text input may then be transmitted to the avatar generation server. In some embodiments, the voice recognition module 44 may be activated by the user, for example via a voice activation button on the client device 10 or via a user control on a display of the client device. In an additional or alternative embodiment, the voice recognition module 44 may be activated automatically, for example upon detecting a vehicle crash via one or more sensors on the client device 10. In such an embodiment, the voice recognition module 44 may prompt the user with questions such as, "Are you okay?" "Do you need assistance?" "Would you like me to find the nearest vehicle repair facility?" "Can I schedule a tow truck to pick up your vehicle?" etc. In some embodiments, the voice recognition module 44 may prompt the user in the user's language of choice. For example, the user may be able to select her language of choice via one or more user controls on the avatar application, such as a drop-down menu. In another example, the avatar application may automatically identify the user's language of choice based on the language of the voice input received from the user. The user may be able to select from English, Spanish, Italian, French, German, Chinese, Japanese, Polish, Russian, Hindi, Hebrew, Arabic, or any other suitable language.

The avatar application 42 may also include an avatar display module 46 which may display the call agent avatar and a response to the user's insurance-related inquiry or banking-related inquiry. Like the voice recognition module 46, the display module 46 may provide a response that is based on the user's language of choice. The response may be an audio response where the call agent avatar is animated in synchronization with the audio response. For example, the call agent avatar may be animated such that gestures and mouth movements match with the words of the audio response. Moreover, the call agent avatar may be displayed to communicate back and forth with the user. For example, the call agent avatar may provide an answer to the insurance-related inquiry or banking-related inquiry and then ask if the user has any other questions, which may be received via the voice recognition module. In another example, the call agent avatar may ask follow up questions to the insurance-related inquiry or banking-related inquiry. For example, when the call agent avatar provides a repair estimate and/or a recommended vehicle repair facility for repairing the vehicle after a crash, the call agent avatar may follow up with the user by asking whether she wants the call agent avatar to arrange for a tow truck to tow the vehicle to the recommended vehicle repair facility, whether she wants the call agent avatar to provide navigation directions to the vehicle repair facility, or whether she wants the call agent avatar to initiate a phone call with the vehicle repair facility for scheduling the repair.

In other embodiments, the response may be a text response and may be displayed, for example, via one or more word balloons adjacent to the call agent avatar. In some embodiments, the text response may be displayed in several portions such that each portion is displayed in a different word balloon, sequentially, where the user may perform a gesture, such as a swipe gesture to read the next word balloon or the next word balloon may be displayed after a predetermined amount of time (e.g., 15 seconds). For example, "Your repair estimate is $3000," may be displayed in a first word balloon; "The nearest repair shop is Joe's Car Repairs 1.3 miles from your current location," may be displayed in a second word balloon; and "Would you like directions to Joe's Car Repairs?" may be displayed in a third word balloon.

In some instances, the client device 10 may communicate with one or more network servers over a digital network 30 via wireless signals and, in some instances, may communicate over the digital network 30 via an intervening wireless or wired device, which may be a wireless router, a wireless repeater, a base transceiver station of a mobile telephony provider, etc. The digital network 30 may be a wireless communication network such as a fourth- or third-generation cellular network (4G or 3G, respectively), a Wi-Fi network (802.11 standards), a WiMAX network, a wide area network (WAN), a local area network (LAN), the Internet, etc. Furthermore, the digital network 30 may be a proprietary network, a secure public Internet, a virtual private network and/or some other type of network, such as dedicated access lines, plain ordinary telephone lines, satellite links, combinations of these, etc. Where the digital network 30 comprises the Internet, data communication may take place over the digital network 30 via an Internet communication protocol.

The network servers may include the avatar generation server 102 which may receive user input from the client device 10. In turn, the avatar generation server 102 may generate and transmit a call agent avatar to the client device 10, where the call agent avatar provides a response to the user input. The avatar generation server 102 may be communicatively coupled to multiple databases such as (i) a customer database 150 which may store customer login information, a customer identifier, customer profile information such as the customer's name, address, indications of insurance policies currently held by the customer, etc.; (ii) an insurance policy database 152 which may store, for each customer or customer identifier, a type of insurance policy held by the customer, an insurance premium amount for the insurance policy, a deductible for the insurance policy, policy coverage limits for the insurance policy, additional insurance policy information, etc.; (iii) a vehicle crash database 154 which may store crash data, such as historical loss information including previously observed or measured amounts of vehicle damage and the corresponding costs of repair associated with a set of impact characteristics for a previously damaged vehicle where the impact characteristics may include the vehicle acceleration, velocity, direction, or images of the vehicle at the time of the vehicle crash, recommended repair facilities for one or several sets of impact characteristics, estimated repair durations for one or several sets of impact characteristics and/or for one or several treatment facilities based on historical repair duration data for the sets of impact characteristics and/or treatment facilities, etc.; and (iv) a static response database 156 which may store static responses as portions of responses to a user's insurance-related inquiry or banking-related inquiry based on a requested action.

For example, if the avatar generation server 102 determines the insurance-related inquiry was asked on the user's morning route to work, the avatar generation server 102 may retrieve a first static response "Good morning John." The avatar generation server 102 may then retrieve the amount of John's vehicle insurance deductible via the customer and insurance policy databases 150, 152, and as a result may retrieve a second static response "Your deductible is . . . " and combine it with the insurance deductible and the first static response to transmit "Good morning John. Your deductible is $500" to John's client device. The avatar generation server 102 may also be communicatively coupled to several other databases, such as an insurance claims database for determining a claim amount, an insurance underwriting database for determining potential insurance premiums for the user, databases for retrieving insurance-related information for other types of insurance, such as homeowners insurance, life insurance, health insurance, renters insurance, etc., a loan application database for determining a current status of a user's loan application, a bank account database for determining account balances, bank statement information, automatic bill pay information, scheduled account transfers, etc., or any other suitable database for retrieving insurance-related or banking-related information.

The avatar generation server 102 may include an avatar response generation module 142, a grammar module 144, and a machine learning module 146. In other embodiments, the grammar module 144 may be included in the natural language processing server 50, as described below or the grammar module 144 may be included in a combination of these devices. In any event, the avatar response generation module 142 may receive the user input and in some embodiments, when the user input is audio input, the avatar response generation module 142 may transcribe the user input into text. In other embodiments, the client device 10 may transcribe the audio input. The avatar response generation module 142 may then call upon the grammar module 144 to transform the text input into a requested action for the avatar generation server 102 to perform. In some embodiments, the grammar module 144 may identify one or several possible requested actions and may assign a probability to each requested action based on the likelihood that the requested action corresponds to the user's insurance-related inquiry or banking-related inquiry. Also in some embodiments, the requested actions may be ranked based on their respective probabilities, and the requested action having the highest probability may be identified as the most likely requested action which may be used to respond to the user's insurance-related inquiry or banking-related inquiry.

The grammar module 144 may compare the received text input to grammar rules stored in a grammar rules database (not shown). For example, based on the grammar rules, the grammar module 144 may determine for each of: (1) "What is my vehicle insurance deductible?" (2) "Give me my car insurance deductible," (3) What do I have to pay on my car insurance claim?" and (4) How much is my deductible on my most recent vehicle claim?" that the requested action or the most likely requested action is to find the user's deductible on his most recent vehicle insurance claim.

This may be determined by the grammar module 144 making inferences based on the context. For example, some of these inquiries do not specify which vehicle insurance claim the user is asking about. However, the grammar module 144 may infer that the inquiry is based on the user's most recent vehicle insurance claim. Also in some embodiments, the grammar module 144 may find synonyms or nicknames for words or phrases in the inquiry to determine the requested action. For example, car insurance may be included within the broader category of vehicle insurance and as a result, the grammar module 144 may determine that the inquiry is for vehicle insurance. Moreover, the grammar module 144 may include a list of categories, such as types of insurance, types of insurance claims, types of insurance issues, etc. In this manner, the grammar module 144 may identify a category within a word or phrase of the inquiry and may identify a requested action that matches with the category.

The grammar module 144 may also communicate with additional databases such as the customer database 150 and the insurance policy database 152 to determine the types of insurance the user has purchased. If, for example, the grammar module 144 identifies that the user has not purchased life insurance, requested actions related to life insurance may not be selected as the requested action.

If the grammar module 144 cannot determine a requested action based on the text input or determines a most likely requested action having a likelihood which is less than a predetermined likelihood threshold (e.g., 75 percent, 50 percent, 30 percent, etc.), the grammar module 144 may cause the client device 10 to provide follow up questions to the user for additional input. Moreover, the grammar module 144 may call upon the machine learning module 146 to learn additional requested actions or a most likely requested action based on the text input.

For example, if on several occasions the user previously asked, "What is my deductible?" and proceeded to explain that the inquiry was for a homeowners insurance deductible after receiving a follow up question from the call agent avatar for additional input, the machine learning module 146 may identify that the most likely requested action is to find the user's homeowners insurance deductible when the user asks, "What is my deductible?" at a different point in time without any follow up questions.

Also in some embodiments, the machine learning module 146 may learn new requested actions based on the user's responses to the follow up questions and/or may identify a series of requested actions to perform in response to a particular insurance-related inquiry or banking-related inquiry. For example, if the insurance-related inquiry is, "What will I recover if my vehicle is totaled?" the machine learning module 146 may learn, based on the user's response to follow up questions, that the requested action is a combination of a first requested action to find the value of the vehicle, a second requested action to find the user's policy limit for the vehicle, a third requested action to find the user's deductible on the vehicle, and a fourth requested action (which had not been previously stored) to determine whether the cost of repair exceeds the value of the user's vehicle, and if so, the amount the user will recover if the vehicle is totaled. If the cost of repair does not exceed the value of the user's vehicle, the fourth requested action may be to determine the amount the user will recover after the applicable deductible is applied.

In some embodiments, the machine learning module 146 may also learn frequent behavior of the user based on the user's insurance-related inquiries, based on purchases as a result of the user's insurance-related inquiries (e.g., purchases related to additional vehicle insurance coverage after asking about the types of coverage included in the user's vehicle insurance policy) and/or based on data retrieved as a result of the insurance-related inquiries, such as sensor data in a vehicle. For example, if the user asks about the status of a vehicle repair on several occasions each regarding a different type of repair to the vehicle within a predetermined amount of time (e.g., one month, three months, one year), the machine learning module 146 may learn that the user is involved in several vehicle crashes or that the user's vehicle is in poor condition. Based on this frequent behavior, the avatar response generation module 142 may generate and transmit push notifications to the client device 10 regarding auto safety recommendations, home safety recommendations, new products, etc., as described in more detail below.

In any event, once a requested action is determined, the avatar response generation module 142 may identify insurance-related information based on a set of rules associated with the requested action. The set of rules may require the avatar response generation module to analyze customer data, insurance data and any other suitable types of data related to the user to identify the insurance-related information. In the example above, where the requested action is to find the user's deductible on his most recent vehicle insurance claim, the associated set of rules may be:

1. Retrieve a customer identifier from the customer database 150.
2. Retrieve vehicle insurance policy information for the user based on the user's customer identifier from the insurance policy database 152.
3. Retrieve a most recent vehicle insurance claim filed by the user based on the user's customer identifier from a vehicle loss report in an insurance claims database.
4. Determine the user's deductible based on the retrieved insurance policy information and the most recent vehicle insurance claim.

More specifically, if the deductible according to the insurance policy information is 15 percent of the claim amount, and the claim amount according to the most recent homeowners insurance claim is $5,000 which is less than the policy limit according to the insurance policy information, then the avatar response generation module 142 may determine that the user's deductible is $750.

In some embodiments, the set of rules for a requested action may be pre-stored in a rules database and in other embodiments, the set of rules may automatically be learned. The avatar generation server 102 may call upon the machine learning module 146 which may use various machine learning techniques to learn the most likely insurance-related information for responding to the requested action and/or the set of rules for identifying the most likely insurance-related information.

For example, the machine learning module 146 may use reinforcement learning techniques to, by trial and error, provide users with insurance-related information and adjust the insurance-related information provided based on feedback from the user. If users repeatedly indicate that the provided insurance-related information answers their inquiries, the avatar generation server 102 may continue to provide the insurance-related information in response to the requested action. On the other hand, if users indicate that the provided insurance-related information does not answer their inquiries, the machine learning module 146 may provide different insurance-related information using different rules in response to the requested action.

In another example, the machine learning module 146 may use other machine learning techniques such as decision trees, naïve Bayes, random forests, boosting, neural networks, support vector machines, etc. The avatar generation server 102 may be provided with a set of training data such as previous requested actions, example insurance-related information provided in response to the requested actions, and a set of rules for determining the insurance-related information. The machine learning module 146 may generate a probabilistic model of the training data using the machine learning techniques mentioned above and may select the most likely insurance-related information and/or a most likely set of rules for determining the insurance-related information based on the probabilistic model. In some embodiments, the machine learning module 146 may continue to update the probabilistic model based on each insurance-related inquiry or banking-related inquiry received from a user and the insurance-related information or banking-related information which satisfies the user's insurance-related inquiry or banking-related inquiry, as indicated by the user.

In any event, the avatar response generation module 142 may retrieve one or more pre-stored responses to the requested action, for example, from the static response database 156. In some embodiments, the set of rules associated with the requested action may include the pre-stored responses to retrieve and/or combine. In the example above where the requested action is to find the user's deductible on his most recent vehicle insurance claim, the associated set of rules may also include:

5. Retrieve an introductory statement from the static response database 156, such as "Good morning," "Good afternoon," "Happy Holiday!" etc., based on the time of day/year and the user's name.

6. Retrieve a generic response to the user's insurance-related inquiry, such as "Your deductible is . . . "

7. Combine the introductory statement and the generic response with the determined insurance-related information.

As a result, the avatar response generation module 142 may generate the response "Good afternoon Jane. Your deductible is $300," which may be provided as a text response and/or an audio response (e.g., via a text to speech engine) to the client device 10.

Additionally, the avatar response generation module 142 may generate the call agent avatar for providing the response. For example, the avatar response generation module 142 may select from one or several pre-stored call agent avatars and/or may render the call agent avatar. The avatar response generation module 142 may also animate the call agent avatar in accordance with the audio response, such that the call agent avatar moves in synchronization with the audio response. In other embodiments, the avatar response generation module 142 may communicate with the client device 10 to render the call agent avatar. For example, the user may be able to customize the appearance of the call agent avatar to include the likeness of a character, person, object, or being. More specifically, the user may upload an image or video of a cartoon character to the avatar application 42, which the user wants to use to depict the call agent avatar. The image or video may be transmitted to the avatar response generation module 142 which may render or animate the call agent avatar using the image or video. In another example, the user may upload an image or video of a famous actor or other celebrity or of one of the user's friends or family. In another example, the avatar response generation module 142 may transmit several templates for rendering the call agent avatar to the avatar application 42 which may be selected as customizable options by the user. The templates may include several faces, hairstyles, body types, skin tones, clothing, etc. Accordingly, the user may combine the various templates in any suitable manner to generate the call agent avatar (e.g., the user may combine face A with hairstyle D, body type E, a tank top, and jean shorts). Additionally, the templates may include several different voices which may also be selected by the user.

In some embodiments, each audio response may be segmented into several phonemes where the call agent avatar is animated to have a particular mouth position specific to each phoneme. For example, for an 'oo' sound the call agent avatar's mouth may form a circle, whereas for an 'm' sound the call agent avatar's mouth may be closed. The call agent avatar also may be animated to move in accordance with the context. For example for, "Have a great day!" the call agent avatar may be animated with a smile. On the other hand for, "I'm sorry to hear about your accident," the call agent avatar may be animated to have a somber expression. In some embodiments, in addition or as an alternative to the audio response, the avatar response generation module 142 may also generate the text response in one or more word balloons adjacent to the call agent avatar. In any event, the image or animation of the call agent avatar as well as the audio and/or text response may be transmitted to be displayed on the user's client device 10 to answer the insurance-related inquiry or banking-related inquiry.

The network servers also may include a natural language processing server 50 for determining a requested action based on the user input, a vehicle repair facility server 60 for identifying the current status of a vehicle repair process including the amount of time remaining in the process, a navigation server (not shown) for example, for determining navigation directions to a selected vehicle repair facility, or any other suitable server for generating the call agent avatar and/or responses to insurance-related inquiries.

The avatar generation server 102 is described in more detail in FIG. 2A. As shown in FIG. 2A, the avatar generation server 102 may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as requested actions, rules associated with each requested action, call agent avatar templates, web page templates and/or web pages, and other data necessary to interact with users through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the avatar generation server 102, which user interface may, for example, allow the system administrator and/or security analyst to configure, troubleshoot, or test various aspects of the server's operation. A server application 238 may operate to receive user input from the client device 10 and to generate/transmit a call agent avatar to the client device 10 where the call agent avatar provides a response to the user input. The server application 238 may be a single module 238 or a plurality of modules 238A, 238B such as the avatar response generation module 142, the grammar module 144, and the machine learning module 146.

While the server application 238 is depicted in FIG. 2A as including two modules, 238A and 238B, the server application 238 may include any number of modules accomplishing tasks related to implementation of the avatar generation server 102. Moreover, it will be appreciated that although only one avatar generation server 102 is depicted in FIG. 2A, multiple avatar generation servers 102 may be provided for the purpose of distributing server load, serving different web pages, etc. These multiple avatar generation servers 102 may include a web server, an entity-specific server (e.g. an Apple® server, etc.), a server that is disposed in a retail or proprietary network, etc.

Referring now to FIG. 2B, the client device 10 may include a display 240, a communication unit 258, a user-input device (not shown), and, like the avatar generation server 102, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the avatar generation server 102 through the digital network 30. In some embodiments, the controller 242 may also include, or otherwise be communicatively connected to, other data storage mechanisms (e.g., one or more hard disk drives, optical storage drives, solid state storage devices, etc.) that reside within the client device 10.

The communication unit 258 may communicate with the avatar generation server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the client device 10, an external hardware keyboard communicating via a wired or a wireless connection (e.g., a Bluetooth keyboard), an external mouse, a microphone for receiving voice input or any other suitable user-input device. As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

In some embodiments, the client device 10 may also include one or more sensors such as a Global Positioning System (GPS), an accelerometer, a gyroscope, etc. The sensors may detect a vehicle crash when the user is in a vehicle, which may automatically activate the avatar generation system 100. In other embodiments, sensor data from the client device 10 may be used to determine insurance-related information such as a cost estimate for repairing a damaged vehicle. In yet other embodiments, when the user is in a vehicle the client device 10 may communicate with a head unit of the vehicle (vehicle head unit) via a communication link, such as Universal Serial Bus (USB), Bluetooth, Wi-Fi Direct, etc. The client device 10 may obtain sensor data from the vehicle head unit which may be used to determine insurance-related information.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be the avatar application 266 as shown in FIG. 1 that may be implemented as a series of machine-readable instructions for performing the various tasks associated with receiving information at, displaying information on, and/or transmitting information from the client device 10.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the avatar generation server 102 while also receiving inputs from the user. Another application of the plurality of applications may include an embedded web browser 276 that may be implemented as a series of machine-readable instructions for receiving, interpreting, and/or displaying web page information from the avatar generation server 102.

One of the plurality of routines may include a voice activation routine 272 which for example, may be implemented by a voice recognition module 44 as shown in FIG. 1. The voice activation routine 272 may receive voice input from the user and transcribe the voice input into text. Another routine in the plurality of routines may include an avatar display routine 274 which for example, may be implemented by an avatar display module 46 as shown in FIG. 1. The avatar display routine 274 may display the call agent avatar on the display 240 and may play the audio response to the user's insurance-related inquiry via an audio output component such as speakers.

Preferably, a user may launch the avatar application 266 from the client device 10, to communicate with the avatar generation server 102 to implement the avatar generation system 100. Additionally, the user may also launch or instantiate any other suitable user interface application (e.g., the native application or web browser 270, or any other one of the plurality of software applications 264) to access the avatar generation server 102 to realize the avatar generation system 100.

Figure 3A:
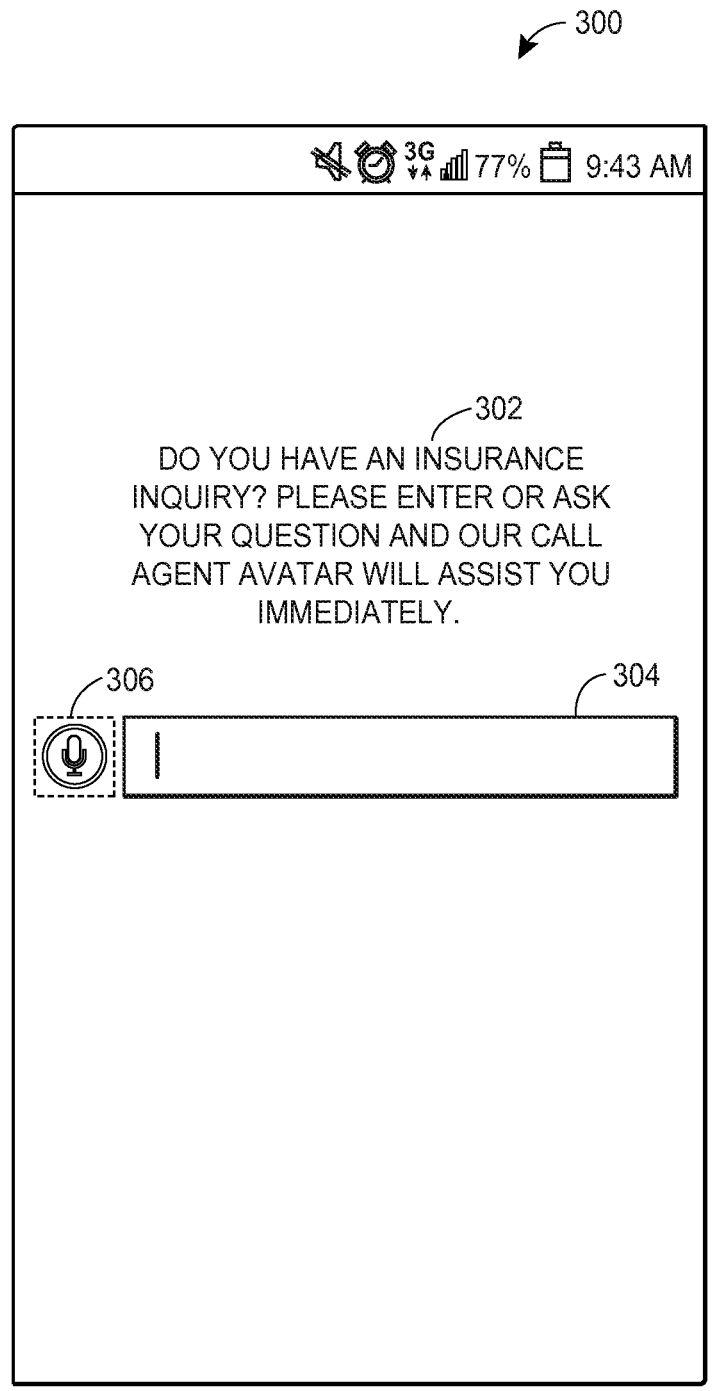
FIG. 3A illustrates an exemplary user input screen of a call agent avatar application in accordance with the presently described embodiments.
Figure 3B:
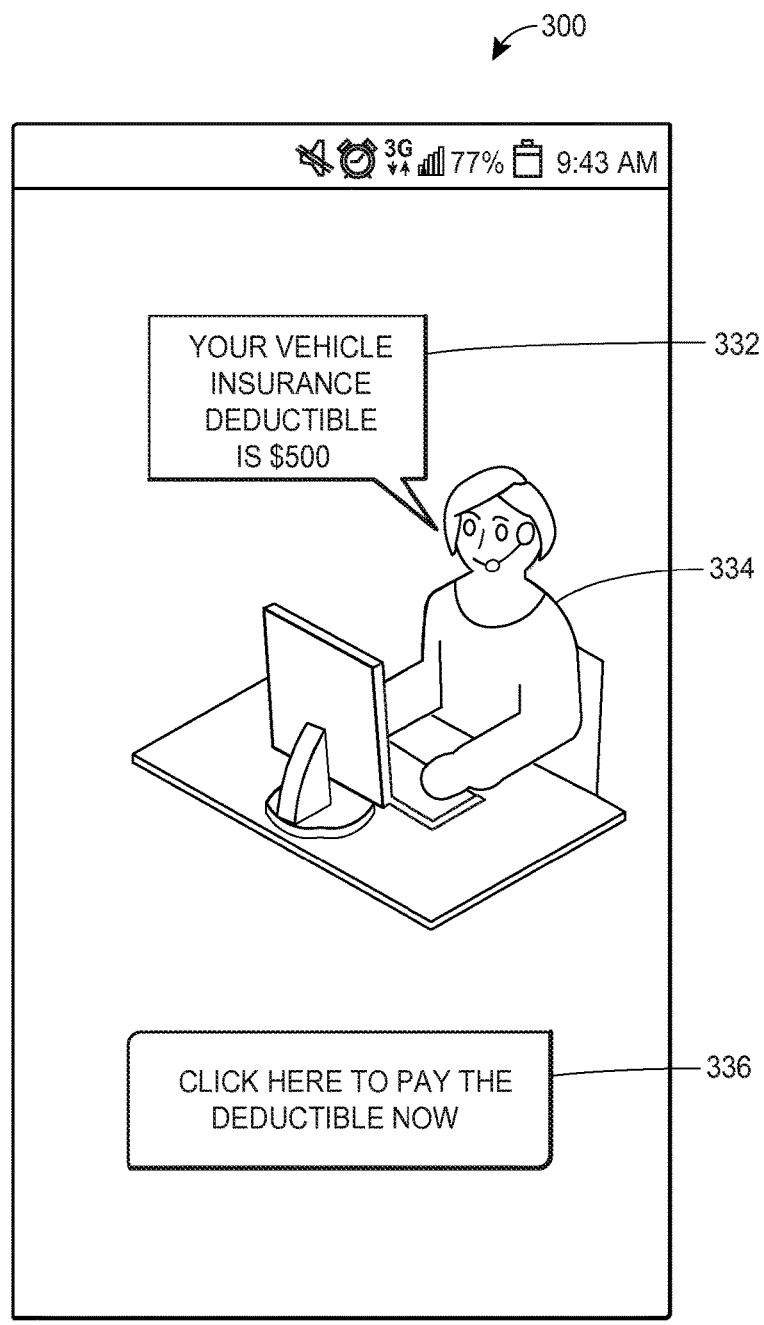
FIG. 3B illustrates a first exemplary call agent avatar screen of a call agent avatar application in accordance with the presently described embodiments.
Figure 3C:
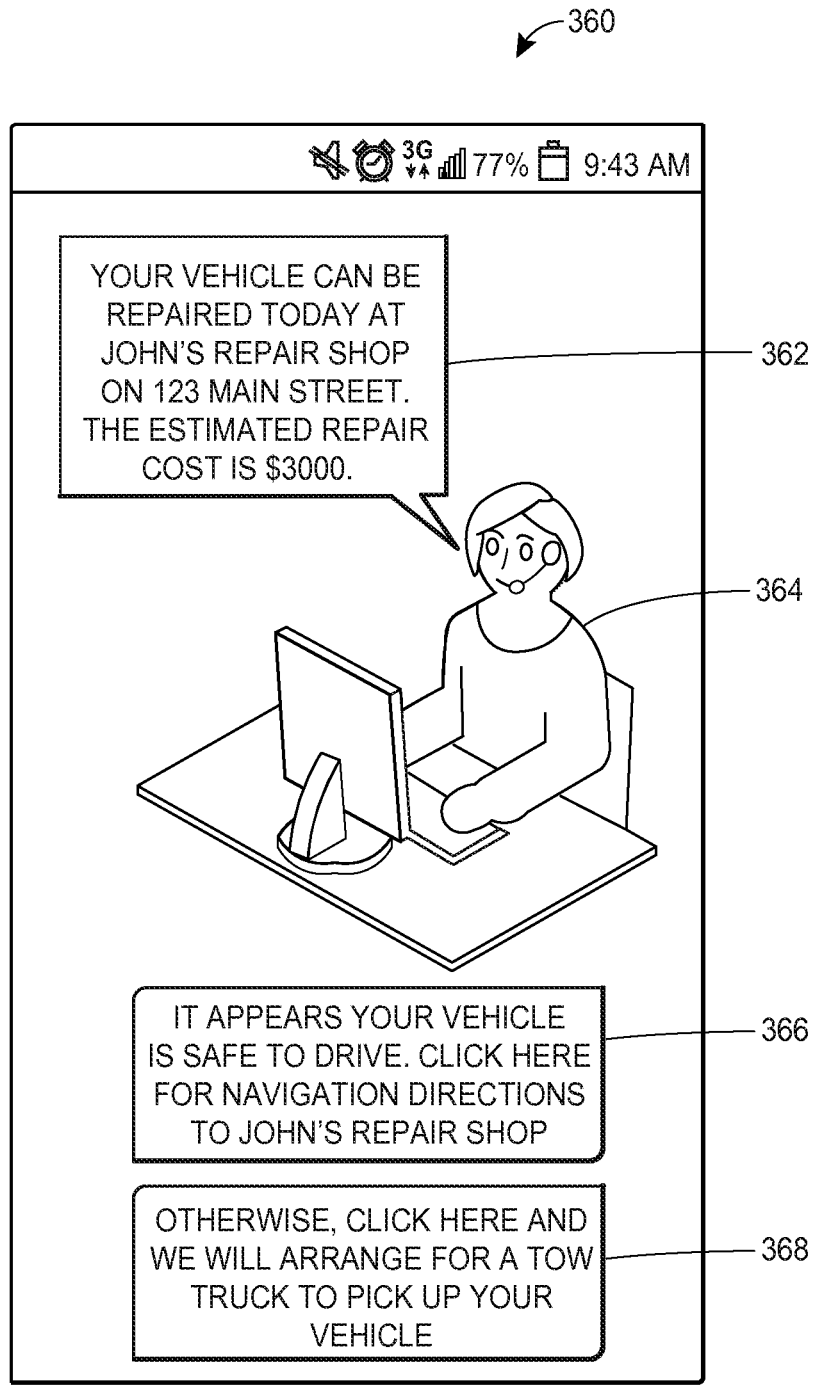
FIG. 3C illustrates a second exemplary call agent avatar screen of a call agent avatar application in accordance with the presently described embodiments.

Using the avatar application 266, the user may request server data (not shown) by navigating a series of avatar application screens. FIGS. 3A-C depict avatar application pages and/or screens that the avatar generation server 102 may transmit in various embodiments of the avatar generation system 100. However, the screens depicted in FIGS. 3A-C are merely illustrations of an exemplary embodiment. In some embodiments, the avatar generation server 102 may transmit web pages.

In any event, the user may launch the avatar application 266 from the client device 10 via any suitable manner, such as touch-selecting an avatar application icon (not shown) on the display 240 of a smart phone, double-clicking on the avatar application icon via a mouse of a computer and/or a trackpad of a laptop. After the user launches the avatar application 266, the user input screen of the avatar application 266 may be displayed to the user on the client device 10.

FIG. 3A depicts an exemplary user input screen 300 which may prompt the user to provide an insurance-related inquiry 302. For example, the prompt 302 may be "Do you have an insurance inquiry? Please enter or ask your question and our call agent avatar will assist you immediately." In some embodiments, when the avatar application 266 is launched automatically, for example, upon detecting that the user has been in a vehicle crash, the prompt 302 may be specific to the detected information. In this scenario, the prompt 302 may be, "Are you okay? Do you need emergency assistance?" or "We've detected you've been in a vehicle crash but the vehicle is safe to drive. If this is correct, would you like us to recommend a vehicle repair facility for repairing the vehicle?"

In any event, the user input screen 300 may also include a user control 304 for receiving/displaying text input for example, from a "soft" keyboard on the display 240 of the client device 10. Additionally, the user input screen 300 may include a voice activation button 306 for receiving an audio input from the user, for example via a microphone. In some embodiments, the client device 10 may then transcribe the audio input into text. After the voice activation button is selected and/or when the avatar application 266 automatically launches, the voice recognition module 44 as shown in FIG. 1 may receive and transcribe the audio input.

The transcribed audio input or text input may be transmitted to the avatar generation server 102, which may in turn identify a requested action based on the text input, generate a text and/or audio response to the requested action including insurance-related information and an animation of a call agent avatar synchronized with the response. The call agent avatar and response may then be displayed on the client device 10.

Additionally, the user input screen 300 or any other suitable screen displayed by the avatar application 266 may include push notifications received from the avatar generation server 102. The push notifications may include recommendations on vehicle safety, vehicle repair facilities, home safety, home security, home liability risks, new products, etc. In some embodiments, the user may select an option via the avatar application 266 to opt-in to receiving the push notifications. For example, the avatar application 266 may include an alert message asking whether the user would like to receive notifications regarding new products, recommendations, etc., which the user may accept or decline. As mentioned above, the push notifications may be based on frequent behavior of the user learned by the machine learning module 146. For example, if based on sensor data in the user's vehicle, the machine learning module 146 learns that the user frequently drives well above the speed limit, the push notification may include a link to an article about the dangers and risks associated with excessive speeding. In another example, if the machine learning module 146 learns that the user has added several types of coverage to her homeowners insurance policy within the last year, but has not purchased flood coverage, the push notification may be an inquiry asking whether the user also wants to purchase this product and a link to a webpage for purchasing the flood coverage. Moreover, if the machine learning module 146 learns that the user has recently purchased vehicle insurance and homeowners insurance, the push notification may be an inquiry asking whether the user would also like to purchase life insurance and a link to a webpage for purchasing life insurance.

FIG. 3B depicts a first exemplary call agent avatar screen 330 which may include a call agent avatar 334. For example, the call agent avatar may be a person with a headset sitting at a computer. In other embodiments, the person may be standing, walking across the screen, etc., and may not have the headset or computer. Additionally, the call agent avatar 334 may be animated. As mentioned above, the call agent avatar may be animated to move in synchronization with the words of the audio response. For example, the audio response may be segmented into several phonemes where the call agent avatar is animated to have a particular mouth position specific to each phoneme. The expressions and movement of the call agent avatar may be based on the content of the audio response. For example, the call agent avatar may be animated to make a hand gesture during the audio response, such as an open palm gesture during the audio response.

In some embodiments, the user may be able to customize the call agent avatar via a call agent design screen (not shown) of the avatar application 266. For example, the user may be able to customize the appearance of the call agent avatar to include the likeness of a character, person, object, or being. More specifically, the call agent design screen may include a user control for receiving images or video of the character, person, object, or being. Upon receiving an uploaded image from the user, the avatar application 266 may transmit the image to the avatar generation server 102 which may generate the call agent avatar according to the uploaded image. In another example, the call agent design screen may include several templates for the user to select from to generate the call agent avatar. The user may choose a face for the call agent avatar from 10 different images of faces. The user may also choose a body type from 20 different images body types ranging from short and skinny to medium build and height to very tall and muscular or tall and heavy. The user's selections may then be combined to form the call agent avatar. Additionally, the templates may include several different voices which may also be selected by the user.

In addition to an audio response, a text response 332, such as "Your vehicle insurance deductible is $500," may be displayed in a word balloon on the first exemplary call agent avatar screen 330. In some embodiments, the text response may be divided into one or several portions where each portion is displayed with a different word balloon. The user may scroll or swipe to view the next word balloon and in some embodiments, the next word balloon may be displayed automatically to match with the audio response. For example, the text response may include three sentences where each sentence is displayed with a different word balloon. When the first sentence has finished in the audio response, the next word balloon may be displayed automatically to match with the audio response.

Furthermore, the first exemplary call agent avatar screen 330 may include a pay button 336 for the user to pay the deductible on her vehicle insurance claim. Upon selecting the pay button 336 by touch-selecting or double clicking, a payment screen (not shown) may be displayed on the client device 10 for receiving payment information for the deductible.

FIG. 3C depicts a second exemplary call agent avatar screen 360, which like the first exemplary call agent avatar screen 330, includes a call agent avatar 364. However, the audio/text response 362 in the second exemplary call agent avatar screen 360 is "Your vehicle can be repaired today at John's Repair Shop on 123 Main Street. The estimated repair cost is $3000." The second exemplary call agent avatar screen 360 may include a navigation button 366, which when selected, may provide navigation directions to John's Repair Shop. For example, the avatar generation server 102 may retrieve the directions from the navigation server. A tow truck button 368 may also be included which when selected, may arrange for a tow truck to pick up the user's vehicle. For example, the avatar generation server 102 may communicate with a tow truck company and provide the tow truck company with the location of the user's vehicle and request immediate assistance. The avatar generation server 102 may also instruct the tow truck company to take the vehicle to a specified vehicle repair facility such as John's Repair Shop.

Each of the audio/text response and the buttons may be generated based on the requested action. In an exemplary scenario, while driving, user Jack Lang crashes into another vehicle causing damage to his vehicle. Based on a spike in acceleration detected on his client device 10, the avatar application 42 automatically launches asking Jack whether he needs emergency assistance. Once Jack confirms he does not have any serious injuries, Jack selects the voice activation button 306 as shown in FIG. 3A and asks, "What should I do with my vehicle?" As a result, the avatar application 42 transcribes the audio input into text and transmits the text to the avatar generation server 102. The avatar generation server 102, and more specifically, the grammar module 144 may then identify a requested action based on the text input, "What should I do with my vehicle?" The requested action may be a stored requested action which corresponds to the text input or may be learned by the machine learning module 146. In any event, the grammar module 144 may compare the text input to grammar rules stored in a grammar rules database. Based on the context, previous insurance-related inquiries from Jack Lang or other users, synonymous words, etc., the grammar module 144 may identify that the requested action is to find an optimal vehicle repair facility for repairing the vehicle and estimate the cost of the vehicle damage. The requested action may be associated with a set of rules stored in a rules database. For example, the associated set of rules may be:

1. Retrieve sensor data from the client device 10 at or near the time of the vehicle crash.
2. If the client device is in communication with a vehicle head unit, retrieve additional sensor data from the vehicle head unit.
3. Compare the retrieved sensor data to crash data in a vehicle crash database 154 to identify damaged vehicle parts, the extent of the damage to each vehicle part, a repair complexity level for repairing the vehicle, and one or more vehicle treatment facilities capable of repairing the vehicle at the identified complexity level.
4. Rank the one or more vehicle treatment facilities capable of repairing the vehicle at the identified complexity level based on one or more repair facility characteristics, such as proximity to the damaged vehicle, average price for performing a repair at the identified difficulty level, average repair duration for performing a repair at the identified difficulty level etc.
5. Select the highest ranking vehicle repair facility. By communicating with the vehicle repair facility server 60 for the highest ranking vehicle repair facility, identify a time to schedule the vehicle repair.
6. If the highest ranking vehicle repair facility cannot perform the repair within a predetermined time period (e.g., three days, five days, a week), communicate with the vehicle repair facility server 60 for the next highest ranking facility until a time is scheduled.
7. Estimate the cost of the repair based on historical cost data for the vehicle repair facility for the same or similar damaged vehicle parts and having the same or similar amount of damage as the damaged vehicle.
8. Determine whether the cost of the repair exceeds the value of the vehicle and/or the policy limit based on insurance data from the insurance policy database 152.
9. Combine the name of the selected vehicle repair facility, the location of the selected vehicle repair facility and the estimated cost of the repair with one or more pre-stored responses from the static response database 156.
10. Provide the response as a text response and an audio response to the client device 10.
11. Retrieve navigation directions to the selected vehicle repair facility from the navigation server.
12. Provide a button for receiving navigation directions and a button for arranging for a tow truck to the client device 10.

When comparing the retrieved sensor data to crash data as in the third rule, the avatar generation server 102 may identify a set of crash data having similar sensor data as the retrieved sensor data. The avatar generation server 102 may estimate the amount of damage to the vehicle and the damaged vehicle parts based on the previously damaged vehicles for the identified set of crash data. Once the extent of vehicle damage has been estimated, an estimate for repairing the vehicle can be determined. In short, various levels of vehicle damage may be equated with various levels of vehicle repair. That is, the estimated extent of vehicle damage can be equated to a repair complexity level. For example, minor, medium, and major vehicle damage can be equated to minor, medium and major vehicle repair. The repair complexity level may represent a degree of difficulty associated with repairing the damaged vehicle.

In any event, after the audio/text response 362 is provided to Jack Lang, if Jack Lang does not ask any follow up questions or proceeds to select one of the buttons 366, 368, the machine learning module 146 may identify the requested action and/or the insurance-related information (e.g., the name of the vehicle repair facility, the location of the vehicle repair facility, and the cost estimate for repairing the vehicle) as the correct requested action and/or insurance-related information. As a result, the machine learning module 146 may update the probabilistic model to increase the likelihood that the requested action and/or insurance-related information is selected in the future based on the user input. On the other hand, if the user does ask follow up questions, the machine learning module 146 may update the probabilistic model to decrease the likelihood that the requested action and/or insurance-related information is selected in the future, may adjust the set of rules associated with the requested action based on the follow up questions, may adjust the insurance-related information based on the follow up questions, etc.

Furthermore, in response to selecting the tow truck button 368, the call agent avatar may continue to interact with the user. For example, the avatar generation server 102 may animate the call agent avatar to move in synchronization with the audio response, "Your tow truck is on its way. The scheduled time of arrival is 6:15 p.m. Please let me know if you need anything else."

As described above, the avatar generation server 102 may communicate with several databases to determine the insurance-related information in accordance with the set of rules. FIG. 4 depicts an exemplary insurance policy database 152 which may store insurance data for each customer. The insurance policy database 152 may include an entry for a customer name 420, a customer identification number 430, an insurance policy type 440 such as vehicle insurance, life insurance, homeowners insurance, renters insurance, health insurance, etc., an insurance deductible 450 which may be a flat rate amount (e.g., $250) or a percentage of the claim amount (e.g., 20%), an insurance coverage limit 460, and an insurance premium 470. For example, customer John Doe 402, 404 having customer identification number 100 may have a vehicle insurance policy with a deductible of $300, an insurance coverage limit which is the actual cash value of the vehicle, and an insurance premium of $50 per month. To determine the value of the vehicle the avatar generation server 102 may communicate with an external server such as a Kelley Blue Book server. Furthermore, customer John Doe 402, 404 also may have a life insurance policy without a deductible having an insurance coverage limit of $100,000 and an insurance premium of $500 per year.

In some embodiments, insurance data for John Doe may be retrieved from the insurance policy database 152 by cross-referencing with the customer database 150. For example, if the requested action is to find the user's vehicle insurance premium, the set of rules associated with the requested action may be to retrieve the user's customer identifier from the customer database 150 and then retrieve the user's insurance premium for vehicle insurance from the insurance policy database 152 using the customer identifier. The customer identifier may be unique to each user and may be associated in the customer database 150 with the user's login information. For example, when the user launches the avatar application 42 on her client device she may be required to enter a username and/or password. When the user successfully logs in to the avatar generation system 100, her username may be the unique customer identifier for retrieving insurance policy data or any other suitable user data. In other embodiments, the customer database 150 may include a unique customer identifier associated with her username which may be retrieved for identifying user data in the customer database 150 or any other suitable database communicatively coupled to the avatar generation server 102.

Figure 5:
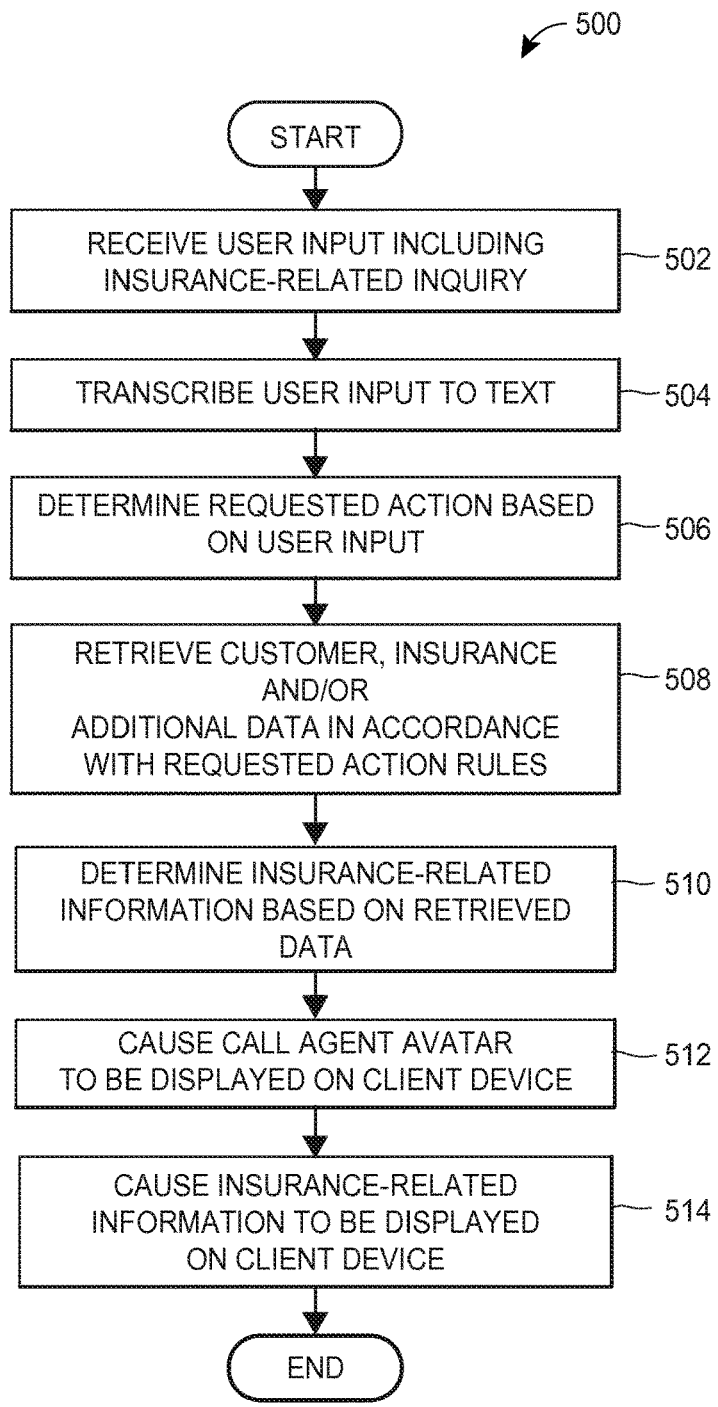
FIG. 5 illustrates a flow diagram representing an exemplary method for generating a call agent avatar in accordance with the presently described embodiments.

FIG. 5 depicts a flow diagram representing an exemplary method 500 for generating a call agent avatar. The method 500 may be executed on the avatar generation server 102. In some embodiments, the method 500 may be implemented in a set of instructions stored on a non-transitory computer-readable memory and executable on one or more processors of the avatar generation server 102. For example, the method 500 may be at least partially performed by the avatar response generation module 142, the grammar module 144, and the machine learning module 146 as shown in FIG. 1.

At block 502, the avatar response generation module 142 may receive user input which may be text or audio input that includes an insurance-related inquiry or banking-related inquiry from the client device 10. In some embodiments, the user may select a language of choice for providing the user input and/or receiving responses from the call agent avatar. For example, the language of choice may be selected via one or more user controls on the client device 10 or may automatically be determined based on the language corresponding to the user input. Also in some embodiments, when the user input is audio input, the avatar response generation module 142 may transcribe the user input into text (block 504). In other embodiments, the client device 10 may perform the transcription.

At block 506, the grammar module 144 may determine a requested action based on the text input. As mentioned above, the grammar module 144 may be included within the avatar generation server 102 or the avatar generation server 102 may communicate with an external natural language processing server 50 to determine the requested action. In any event, the grammar module 144 may compare the text input to grammar rules stored in a grammar rules database (not shown). The grammar module 144 may make inferences based on the context, may find synonyms or nicknames for words or phrases in the inquiry, may identify one or more categories which correspond to words or phrases in the inquiry, etc. The grammar module 144 may also communicate with additional databases such as the customer database 150 and the insurance policy database 152 to determine the types of insurance the user has purchased to verify that the requested action corresponds to a type of insurance that the user has purchased or is likely to purchase.

If the grammar module 144 cannot determine a requested action based on the text input or determines a most likely requested action having a likelihood which is less than a predetermined likelihood threshold, the grammar module 144 may cause the client device 10 to provide follow up questions to the user for additional input. Furthermore, the grammar module 144 may communicate with the machine learning module 146 to learn additional requested actions or a most likely requested action based on the text input.

For example, the machine learning module 146 may identify patterns in the user's or other users' previous insurance-related inquiries and identify requested actions based on the patterns. For example, if the user consistently asks for her insurance premium when she is referring to her life insurance premium, the machine learning module 146 may identify for the grammar module 144 that the most likely requested action is to find her life insurance premium when the user asks for her insurance premium without specifying the type insurance. In another example, if the grammar module 144 identifies two requested actions to perform in response to a particular insurance-related inquiry by the user, the machine learning module 146 may associate the two requested actions with the insurance-related inquiry. In this manner, when the user later inputs the same insurance-related inquiry, the machine learning module 146 may identify for the grammar module 144 the two requested actions to perform.

In any event, once a requested action is determined, the avatar response generation module 142 may identify a set of rules associated with the requested action for determining insurance-related information corresponding to the requested action. In some embodiments, the set of rules for a requested action may be pre-stored in a rules database and in other embodiments, the set of rules may automatically be learned. The avatar generation server 102 may call upon the machine learning module 146 which may use various machine learning techniques to learn the most likely insurance-related information for responding to the requested action and/or the set of rules for identifying the most likely insurance-related information.

The associated set of rules may require the avatar response generation module 142 to retrieve and analyze customer data, insurance data, and/or any other suitable data for determining the insurance-related information (block 508) from internal data sources communicatively coupled to the avatar generation server, such as the customer database 150, the insurance policy database 152, the vehicle crash database 154, etc. The data may also be retrieved from external data sources via the digital network 30, such as a vehicle repair facility server, a Kelley Blue Book server, a Department of Motor Vehicles (DMV) server, etc. For example, the avatar response generation module 142 may transmit a request for a particular set of information to the external data source and in turn may receive external data.

For example, when a user launches the avatar application 42 on her client device 10, she may be required to log in to the avatar generation system 100 by entering a username and/or password. In some embodiments, the user may be required to login when she first launches the avatar application 42 and the login information may be stored by the avatar application 42 so that she does not have to login again. In any event, based on the login information the set of rules associated with the requested action may require the avatar response generation module 142 to retrieve a unique customer identifier associated with the username and/or password from the customer database 150. The unique customer identifier may then be used to retrieve other user data from the internal data sources, such as insurance policy information from the insurance policy database 152. Moreover, the set of rules associated with the requested action may also require the avatar response generation module 142 to retrieve additional information from the customer database 150 which may uniquely identify the user at external data sources. For example, the user's name, address, and/or date of birth may be retrieved from the customer database 150 to uniquely identify the user.

As a result, the avatar response generation module 142 may determine the insurance-related information using the retrieved customer data, insurance data, and other suitable data (block 510). For example, the insurance-related information may be an insurance deductible amount for a particular type of insurance, an insurance premium amount for a particular type of insurance, an estimated insurance premium for a particular type of insurance which the user does not currently have (e.g., an insurance quote), an estimated insurance claim amount such as an estimated vehicle repair cost, a vehicle repair facility for repairing the vehicle, a location of the vehicle repair facility including navigation directions to the location, an estimated duration of the vehicle repair, a current status of a vehicle repair such as the time remaining and/or the current stage of the vehicle repair, etc.

The avatar response generation module 142 may then combine the insurance-related information with one or more pre-stored responses corresponding to the requested action, for example, from the static response database 156 to generate a text and/or audio response. The pre-stored responses may be selected and combined with the insurance-related information in accordance with the set of rules associated with the requested action. For example, the response for a requested action of provide an insurance quote for homeowners insurance may be, "Thank you for considering us for insuring your home. After carefully evaluating all appropriate rating factors, personal data and insurance history, the lowest premium we can offer you is $600 per month. Here is a list of coverage included in this policy . . . . If you would like to proceed to purchasing the policy please select the button below or tell me that you would like to make the purchase. Please let me know if you have any questions or concerns or there is anything else I can help you with."

The response may be transformed from text to audio, for example using a text to speech engine, and the avatar response generation module 142 may also generate a call agent avatar. The call agent avatar may be animated to move in synchronization with the response, and the avatar response generation module 142 may cause the call agent avatar (block 512) and the response including the insurance-related information to be displayed on the user's client device 10. In this manner, the call agent avatar may appear to be providing the response to the user. In some embodiments, the audio response may be played by the client device 10 and the text response may be displayed in one or more word balloons on the display 240 of the client device 10.

If the user confirms that the response answers her insurance-related inquiry or does not ask any follow up questions, the machine learning module 146 may receive an indication that the requested action and/or insurance-related information is correct for the insurance-related inquiry and may adjust the probabilistic model accordingly. Moreover, if the user asks follow up questions or indicates that the response does not answer her insurance-related inquiry, the machine learning module 146 may receive an indication that the requested action and/or insurance-related information is incorrect for the insurance-related inquiry and may adjust the probabilistic model.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:
1. A computer-implemented method for generating a call agent avatar, the method executed by one or more processors programmed to perform the method, the method comprising:
receiving, at one or more processors in a server device, input from a client device of a user including an insurance-related inquiry;
identifying, at the one or more processors, a plurality of requested actions for the one or more processors to perform, wherein each requested action is performed in response to an insurance-related inquiry and includes a set of rules for providing a response to the corresponding insurance-related inquiry, and wherein the response includes insurance-related information;
transforming, by the one or more processors, the input from the user to a requested action of the plurality of requested actions by:
comparing, by the one or more processors, the input to a set of grammar rules;
identifying, by the one or more processors, a plurality of requested actions;
analyzing, by the one or more processors via a grammar module, the input to identify a likelihood that each of the plurality of requested actions corresponds to the input;
assigning, by the one or more processors, a probability to each of the plurality of requested actions based on the likelihood that each requested action corresponds to the input;
ranking, by the one or more processors, each of the plurality of requested actions based on their respective probabilities;
identifying, by the one or more processors, the requested action from the plurality of requested actions based on the comparison, including:
identifying, by the one or more processors, a first requested action of the plurality of requested actions having a highest probability of corresponding to the input based on the comparison of the input to the set of grammar rules;
determining, by the one or more processors, that the first requested action has a likelihood of corresponding to the input that is less than a predetermined threshold likelihood;
requesting, by the one or more processors, additional input from the user; and
determining, by the one or more processors, a second requested action as a new requested action based on the input and the additional input;
performing the new requested action, by the one or more processors and via the set of rules which correspond to the new requested action, including analyzing customer data and insurance data corresponding to the user to identify insurance-related information in response to the new requested action;
providing, by the one or more processors to the client device of the user, a graphical representation of a customer service representative for display on the client device; and
providing, by the one or more processors to the client device, a response to the insurance-related inquiry for presentation on the client device, including animating the graphical representation of the customer service representative to move in synchronization with the response, wherein the response includes the insurance-related information.

2. The method of claim 1, wherein the input is an audio input and transforming the input to a requested action includes:
transcribing, by the one or more processors, the audio input into a text input.

3. The method of claim 1, wherein each of the plurality of requested actions is associated with one or more pre-stored responses, the insurance-related information, and the set of rules for determining the insurance-related information in response to the requested action.

4. The method of claim 1, wherein the second requested action is automatically learned as the new requested action based on the input and the additional input such that the additional input is not requested to determine the new requested action when a same input is received at a later time.

5. The method of claim 1, further comprising:
receiving, by the one or more processors, impact characteristics for a vehicle of the user based on sensor data from one or more sensors communicatively coupled to the client device;
identifying, by the one or more processors, that the user has been in a vehicle crash based on the impact characteristics; and
in response to identifying the vehicle crash, causing, by the one or more processors, voice recognition in the client device to be automatically activated to receive the input.

6. The method of claim 1, wherein when the new requested action is to begin a vehicle claims process, the method further comprises:
receiving, by the one or more processors, impact characteristics for a damaged vehicle of the user;
determining, by the one or more processors, a repair complexity level for repairing the damaged vehicle based on the impact characteristics, wherein the repair complexity level represents a degree of difficulty associated with repairing the damaged vehicle; and
selecting, by the one or more processors, a vehicle repair facility for treating the damaged vehicle based on the repair complexity level;
wherein the insurance-related information includes information associated with transporting the damaged vehicle to the selected vehicle repair facility.

7. The method of claim 1, wherein when the new requested action is to provide an amount of a vehicle claim deductible, the method further comprises:
retrieving, by the one or more processors, a customer identifier associated with the user;
retrieving, by the one or more processors, a vehicle loss report associated with the user based on the customer identifier;
retrieving, by the one or more processors, a vehicle insurance policy associated with the user based on the customer identifier; and
determining, by the one or more processors, an amount of the vehicle claim deductible based on the vehicle loss report and the vehicle insurance policy;
wherein the insurance-related information is the amount of the vehicle claim deductible.

8. The method of claim 1, wherein the response is an audio response, and further comprising animating, by the one or more processors, the graphical representation to match the audio response.

9. The method of claim 1, wherein the response is a text response segmented into a plurality of portions, and each portion of the text response is displayed at a different point in time during the animation of the customer service representative.

10. A system for generating a call agent avatar, the system comprising:
one or more processors;
a communication network;
a non-transitory computer-readable memory coupled to the one or more processors, and the communication network, and storing thereon instructions that, when executed by the one or more processors, cause the system to:
receive, via the communication network, input from a client device of a user including an insurance-related inquiry;
identify a plurality of requested actions for the one or more processors to perform, wherein each requested action is performed in response to an insurance-related inquiry and includes a set of rules for providing a response to the corresponding insurance-related inquiry, and wherein the response includes insurance-related information;
transform the input from the user to a requested action of the plurality of requested actions by:
comparing the input to a set of grammar rules;
identifying a plurality of requested actions;
analyzing, via a grammar module, the input to identify a likelihood that each of the plurality of requested actions corresponds to the input;
assigning a probability to each of the plurality of requested actions based on the likelihood that each requested action corresponds to the input;
ranking each of the plurality of requested actions based on their respective probabilities;
identifying the requested action from the plurality of requested actions based on the comparison, including:
identifying a first requested action of the plurality of requested actions having a highest probability of corresponding to the input based on the comparison of the input to the set of grammar rules;
determining that the first requested action has a likelihood of corresponding to the input that is less than a predetermined threshold likelihood;
requesting additional input from the user; and
determining a second requested action as a new requested action based on the input and the additional input;
perform the new requested action, via the set of rules which correspond to the new requested action, including analyzing customer data and insurance data corresponding to the user to identify insurance-related information in response to the new requested action;
provide, via the communication network to the client device of the user, a graphical representation of a customer service representative for display on the client device; and
provide, via the communication network to the client device, a response to the insurance-related inquiry for presentation on the client device, including animating the graphical representation of the customer service representative to move in synchronization with the response, wherein the response includes the insurance-related information.

11. The system of claim 10, wherein the input is an audio input and to transform the input to a requested action, the instructions cause the system to:
transcribe the audio input into a text input.

12. The system of claim 10, wherein the second requested action is automatically learned as the new requested action based on the input and the additional input such that the additional input is not requested to determine the new requested action when a same input is received at a later time.

13. The system of claim 10, wherein the instructions further cause the system to:
receive, via the communication network, impact characteristics for a vehicle of the user based on sensor data from one or more sensors communicatively coupled to the client device;
identify that the user has been in a vehicle crash based on the impact characteristics; and
in response to identifying the vehicle crash, cause, via the communication network, voice recognition in the client device to be automatically activated to receive the input.

14. The system of claim 10, wherein when the new requested action is to begin a vehicle claims process, the instructions further cause the system to:
receive, via the communication network, impact characteristics for a damaged vehicle of the user;
determine a repair complexity level for treating the damaged vehicle based on the impact characteristics, wherein the repair complexity level represents a degree of difficulty associated with treating the damaged vehicle; and
select a vehicle repair facility for treating the damaged vehicle based on the repair complexity level;
wherein the insurance-related information includes information associated with transporting the damaged vehicle to the selected vehicle repair facility.

15. The system of claim 10, wherein when the new requested action is to provide an amount of a vehicle claim deductible, the instructions further cause the system to:
retrieve a customer identifier associated with the user;
retrieve a vehicle loss report associated with the user based on the customer identifier;
retrieve a vehicle insurance policy associated with the user based on the customer identifier; and
determine an amount of the vehicle claim deductible based on the vehicle loss report and the vehicle insurance policy;
wherein the insurance-related information is the amount of the vehicle claim deductible.

16. The system of claim 10, wherein the response is an audio response, and further comprising animating, by the one or more processors, the graphical representation to match the audio response.

17. The system of claim 10, wherein the response is a text response segmented into a plurality of portions, and each portion of the text response is displayed at a different point in time during the animation of the customer service representative.

18. The method of claim 1, wherein animating the graphical representation of the customer service representative to move in synchronization with the response includes animating the graphical representation of the customer service representative to change expression in accordance with a context of the response.

* * * * *